United States Patent
Wang He

(10) Patent No.: US 9,091,796 B2
(45) Date of Patent: Jul. 28, 2015

(54) OPTICAL COUPLING DEVICE AND BACKLIGHT MODULE

(71) Applicant: HON HAI PRECISION INDUSTRY CO., LTD., New Taipei (TW)

(72) Inventor: Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 151 days.

(21) Appl. No.: 13/867,112

(22) Filed: Apr. 21, 2013

(65) Prior Publication Data

US 2014/0185320 A1    Jul. 3, 2014

(30) Foreign Application Priority Data

Dec. 27, 2012   (TW) .............................. 101150699 A

(51) Int. Cl.
*F21V 7/04*     (2006.01)
*F21V 8/00*     (2006.01)

(52) U.S. Cl.
CPC ............ *G02B 6/0028* (2013.01); *G02B 6/0021* (2013.01)

(58) Field of Classification Search
CPC .... G02B 6/0018; G02B 6/0021; G02B 6/002; G02B 6/0028; G02B 6/0038; G02B 6/0068; G02B 6/0023; G02B 6/0048; G02B 6/005; G02B 6/0055; G02B 6/0046; G02B 6/0031; G02B 6/0078; G02B 6/0011; G02B 6/0035; G02B 6/0013; G02B 6/0033

USPC ......... 362/606, 610, 615, 616, 617, 618, 619, 362/621, 622, 623, 624, 625, 511

See application file for complete search history.

(56) References Cited

U.S. PATENT DOCUMENTS

| | | | |
|---|---|---|---|
| 2007/0008739 A1* | 1/2007 | Kim et al. ..................... | 362/612 |
| 2008/0106914 A1* | 5/2008 | Wei et al. ..................... | 362/621 |
| 2008/0316770 A1* | 12/2008 | Oku et al. .................... | 362/617 |
| 2009/0027920 A1* | 1/2009 | Parker .......................... | 362/619 |
| 2009/0034292 A1* | 2/2009 | Pokrovskiy et al. .......... | 362/617 |
| 2011/0286237 A1* | 11/2011 | Tanoue et al. ................ | 362/606 |
| 2011/0292321 A1* | 12/2011 | Travis et al. .................... | 349/65 |
| 2013/0114301 A1* | 5/2013 | Um ............................... | 362/621 |
| 2014/0132887 A1* | 5/2014 | Kurata ............................ | 349/65 |

* cited by examiner

*Primary Examiner* — Thomas A Hollweg
*Assistant Examiner* — Kevin Quarterman
(74) *Attorney, Agent, or Firm* — Novak Druce Connolly Bove + Quigg LLP

(57) ABSTRACT

An optical coupling device is used for optically coupling light sources with a light guide plate. The optical coupling device includes transparent light guide portions. Each light guide portion has a light incident surface, a light emitting surface, a top surface, and a bottom surface. The light incident surface is opposite to the light emitting surface. The top surface is opposite to the bottom surface. Along a direction perpendicular to the top surface, a thickness of the light incident surface is greater than a thickness of the light emitting surface. The light incident surface is optically coupled with a corresponding one of the light sources. The light emitting surface is optically coupled with the light guide plate.

14 Claims, 3 Drawing Sheets

OPTICAL COUPLING DEVICE AND BACKLIGHT MODULE

BACKGROUND

1. Technical Field

The present disclosure relates to an optical coupling device and a backlight module having the optical coupling device.

2. Description of Related Art

Currently, a side-type backlight module includes a light guide plate and a number of light sources positioned on a light incident side of the light guide plate. Although the thickness of the light guide plate is becoming smaller, it is very difficult to reduce the thickness of the light sources. Therefore, the optically coupling efficiency between the light guide plate and the light sources is low, the light rays entering the light guide plate are reduced, and the brightness of the backlight module is low.

Therefore, it is desirable to provide an optical coupling device and a backlight module that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
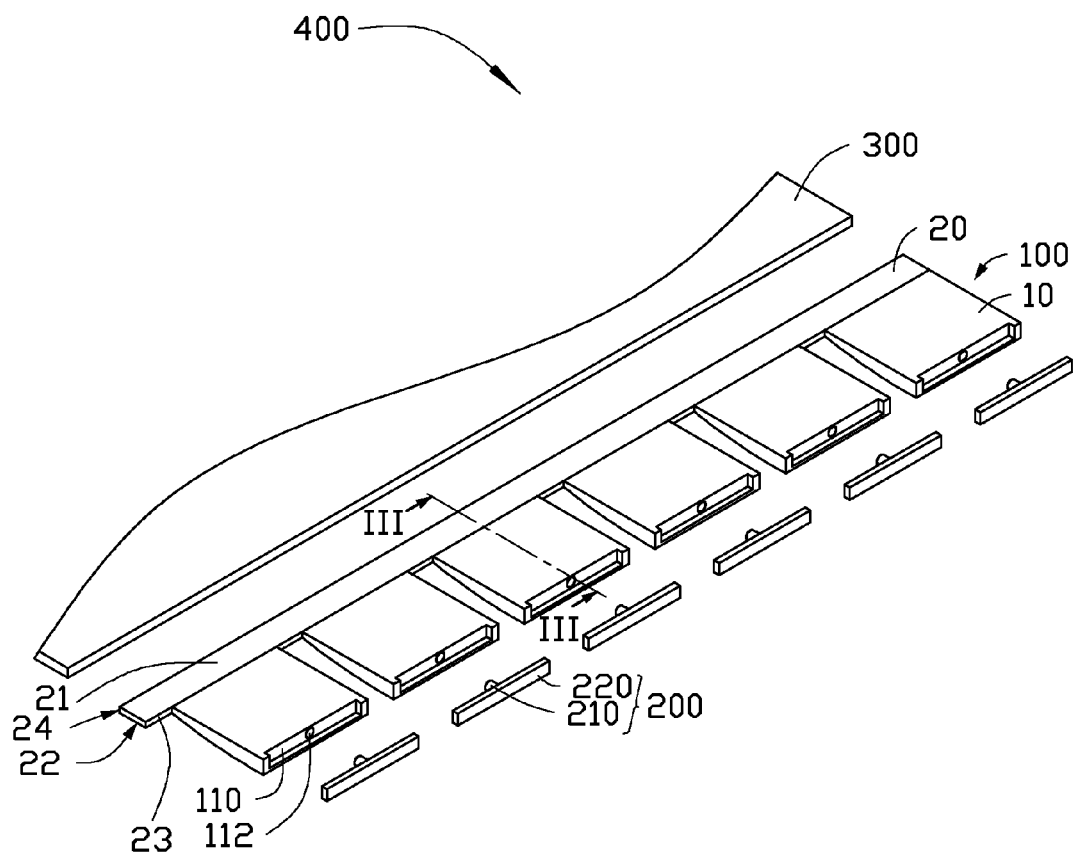
FIG. 1 is a schematic view of a backlight module, according to an exemplary embodiment; the backlight module includes a number of light guide portions.

FIG. 1 illustrates a backlight module 400 in accordance with an embodiment.

The backlight module 400 includes a light guide plate 300, a number of light sources 200, and an optical coupling device 100. The optical coupling device 100 is positioned between the light guide plate 300 and the light sources 200, and is used for coupling light rays from the light sources 200 into the light guide plate 300. In the embodiment, the light sources 200 are light emitting diodes, and each of the light sources 200 includes a light emitting portion 210 and a substrate 220. The light emitting portion 210 is fixed to the substrate 220, and is electrically connected to the substrate 220. The substrate 220 is electrically connected to an external printed circuit board (PCB, not shown), and thus the substrate 220 can receive electrical signals from the external PCB to control the light emitting portion 210 to emit light rays.

The optical coupling device 100 is made of transparent material, and includes a number of light guide portions 10 and a connecting portion 20.

Figure 2:
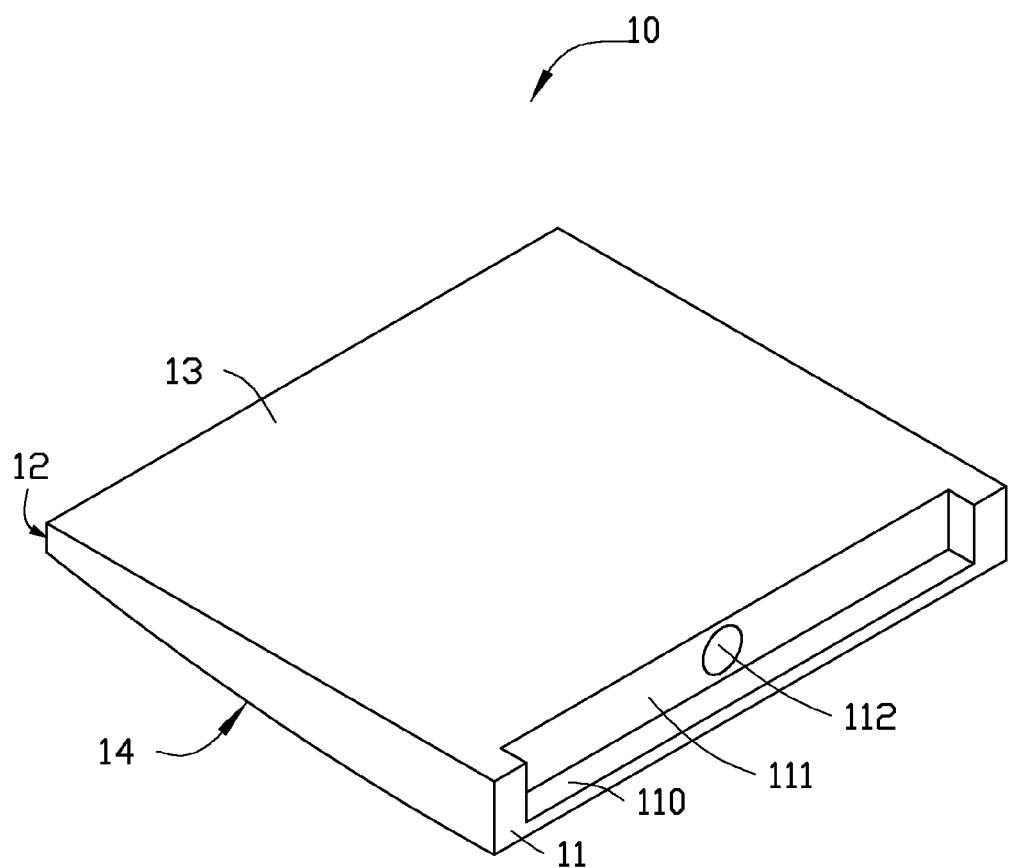
FIG. 2 is a schematic view of each of the light guide portions of the backlight module of FIG. 1.
Figure 3:
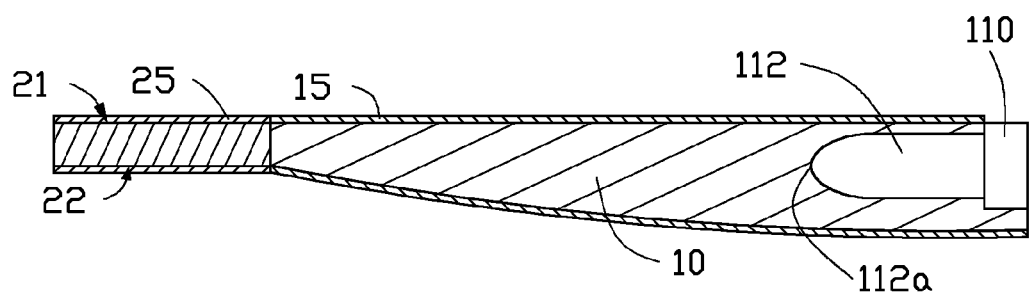
FIG. 3 is a schematic cross-sectional view of each of the light guide portions, taken along a line III-III of FIG. 1.

Also referring to FIGS. 2 and 3, the structures of the light guide portions 10 are the same as each other, and are spatially corresponding to the light sources 200. Each of the light guide portions 10 is wedge-shaped, and includes a light incident surface 11, a light emitting surface 12, a top surface 13, and a bottom surface 14. The light emitting surface 12 is opposite to the light incident surface 11. The top surface 13 is perpendicularly connected to the light incident surface 11 and the light emitting surface 12. The bottom surface 14 is inclined with respect to the top surface 13. Along a direction perpendicular to the top surface 13, the thickness of the light incident surface 11 is greater than the thickness of the light emitting surface 12. The light sources 200 are optically coupled with the light incident surface 11 of the corresponding light guide portion 10. The top surface 13 and the bottom surface 14 are coated by a first reflective film 15 to internally reflect the light rays in the light guide portion 100, and thus the light rays can be transmitted towards the light emitting surface 12.

The light incident surface 11 defines a receiving groove 110 passing through the top surface 13. The receiving groove 110 has a side wall 111 opposite to the light emitting surface 12. The side wall 111 defines a light diffusion hole 112 for diffusing the light rays from the corresponding light emitting portion 210, and thus the light emitting angle of the light rays can be enlarged, and thus the light density of the light emitting surface 12 becomes uniform. The light diffusion hole 112 is a blind hole and has an arc-shaped surface 112a adjacent to the light emitting surface 12. The substrate 220 is received in the receiving groove 110, and the light emitting portion 210 extends into the light diffusion hole 112, and thus the light sources 200 can be precisely aligned with the light guide plate 300.

The connecting portion 20 is pole-shaped, and is used for connecting the light guide plates 10 together, and guiding the light rays emitting from the light emitting surface 12 to the light guide plate 300. The connecting portion 20 has a top wall 21, a bottom wall 22, a first side wall 23, and a second side wall 24. The bottom wall 22 is opposite to the top wall 21. The top wall 21 and the bottom wall 22 are coated by a second reflective film 25, and are used for internally reflecting the light rays in the connecting portion 20. The second side wall 24 is opposite to the first side wall 23. The first side wall 23 is contacted with the emitting surfaces 12 of the light guide portions 10, and thus the first side wall 23 can receive the light rays from the light guide portions 10, and the connecting portion 20 can be optically coupled with the light guide portions 10.

The second side wall 24 is optically coupled with the light guide plate 300, and thus most of the light rays from the light connecting portion 20 can enter into the light guide plate 300. Along a direction perpendicular to the top surface 13, the thickness of the second side wall 24 is substantially equal to the thickness of the light guide plate 300. In this embodiment, the edge of the connecting portion 20 is glued with the light emitting surfaces 12 of the light guide portions 10. In other embodiments, the connecting portion 20 and the light guide portions 10 can be integrally formed, and the connecting portion 20 also can be omitted.

By employing the optical coupling device 100, the optical coupling efficiency of the light sources 200 and the light guide portions 10 is improved, and the optical coupling efficiency of the light guide portions 10 and the light guide plate 300 is improved. Therefore, the optical coupling efficiency of the light guide plate 300 and the light sources 200 is improved, when the thickness of the light sources 200 remains unchanged.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An optical coupling device for optically coupling a plurality of light sources with a light guide plate, the optical coupling device comprising:
a plurality of transparent light guide portions, each of the light guide portions comprising:
a light incident surface;
a light emitting surface opposite to the light incident surface;
a top surface perpendicularly connected to the light incident surface and the light emitting surface; and
a bottom surface opposite to the top surface;
wherein along a direction perpendicular to the top surface, a thickness of the light incident surface is greater than a thickness of the light emitting surface, the light incident surface is configured to optically couple with a respective one of the light sources, and the light emitting surface is configured to optically couple with the light guide plate; the light coupling device comprises a connecting portion having a pole-shape and being made of transparent material, the connecting portion is optically coupled with the light guide plate, the connecting portion connects the light guide portions together and contacts light emitting surfaces of the light guide portions to guide light rays emitting from the light emitting surfaces to the light guide plate.

2. The optical coupling device of claim 1, wherein each of the top surface and the bottom surface is coated by a first reflective film, and is configured for internally reflecting light rays in each of the light guide portions.

3. The optical coupling device of claim 1, wherein the light incident surface defines a receiving groove, and the receiving groove is configured to receive the respective light source.

4. The optical coupling device of claim 3, wherein the receiving groove has a side wall opposite to the light emitting surface, the side wall defines a light diffusion hole, and the light diffusion hole is configured to receive a light emitting portion of the respective light source and diffuse light rays from the light emitting portion of the respective light source.

5. The optical coupling device of claim 4, wherein the light diffusion hole has an arc-shaped surface adjacent to the light emitting surface.

6. The optical coupling device of claim 1, wherein the connecting portion has a top wall, a bottom wall, a first side wall, and a second side wall, the top wall is opposite to the bottom wall, the second side wall is opposite to the first side wall, the first side wall is optically coupled with the light emitting surfaces to receive the light rays from the light guide portions.

7. The optical coupling device of claim 6, wherein the top wall and the bottom wall are all coated by a second reflective film, and are configured for internally reflecting light rays in the connecting portion.

8. A backlight module, comprising:
a light guide plate;
a plurality of light sources; and
an optical coupling device positioned between the light guide plate and the light sources, the optical coupling device comprising:
a plurality of transparent light guide portions spatially corresponding to the light sources; each of the light guide portions comprising:
a light incident surface facing the light sources;
a light emitting surface opposite to the light incident surface;
a top surface perpendicularly connected to the light incident surface and the light emitting surface; and
a bottom surface opposite to the top surface;
wherein along a direction perpendicular to the top surface, a thickness of the light incident surface is greater than a thickness of the light emitting surface, the light incident surface is optically coupled with a respective one of the light sources, and the light emitting surface is optically coupled with the light guide plate; the light coupling device comprises a connecting portion having a pole-shape and being made of transparent material, the connecting portion is optically coupled with the light guide plate, the connecting portion connects the light guide portions together and contacts light emitting surfaces of the light guide portions to guide light rays emitting from the light emitting surfaces to the light guide plate.

9. The backlight module of claim 8, wherein each of the top surface and the bottom surface is coated by a first reflective film, and is configured for internally reflecting light rays in each of the light guide portions.

10. The backlight module of claim 8, wherein the light incident surface defines a receiving groove, the receiving groove has a side wall opposite to the light emitting surface, the side wall defines a light diffusion hole having an arc-surface adjacent to the light emitting surface, each of the light sources has a light emitting portion and a substrate, the light emitting portion is positioned on the substrate, the substrate is received in the receiving groove, the light emitting portion extends into the light diffusion hole, the light diffusion hole is configured for diffusing the light rays from the corresponding light emitting portion.

11. The backlight module of claim 10, wherein the light diffusion hole has an arc-shaped surface adjacent to the light emitting surface.

12. The backlight module of claim 8, wherein the light incident surface defines a receiving groove, and the receiving groove receives the respective light source.

13. The backlight module of claim 8, wherein the connecting portion has a top wall, a bottom wall, a first side wall, and a second side wall, the top wall is opposite to the bottom wall, the second side wall is opposite to the first side wall, the first side wall is optically coupled with the light emitting surfaces to receive light rays from the light guide portions, the second side wall is optically coupled with the light guide plate to transmit the light rays entering the connecting portion into the light guide plate, along a direction perpendicular to the top wall, a thickness of the second side wall is substantially equal to a thickness of the light guide plate.

14. The backlight module of claim 13, wherein the top wall and the bottom wall are coated by a second reflective film, and are configured for internally reflecting the light rays in the connecting portion.

* * * * *